United States Patent [19]

Igata

[11] Patent Number: 5,124,973
[45] Date of Patent: Jun. 23, 1992

[54] TILT CONTROL MECHANISM

[75] Inventor: Toyonori Igata, Saitama, Japan

[73] Assignee: Pioneer Electronic Corporation, Tokyo, Japan

[21] Appl. No.: 293,779

[22] Filed: Jan. 4, 1989

[30] Foreign Application Priority Data

Feb. 4, 1988 [JP] Japan .............................. 63-13759[U]
Feb. 4, 1988 [JP] Japan .............................. 63-13760[U]

[51] Int. Cl.⁵ ...................... G11B 7/095; G11B 21/21
[52] U.S. Cl. ................................... 369/244; 369/44.32
[58] Field of Search ............ 369/249, 244, 215, 44.16, 369/44.32, 219

[56] References Cited

U.S. PATENT DOCUMENTS

| | | | |
|---|---|---|---|
| 4,607,357 | 8/1986 | Okano | 369/44.32 |
| 4,634,853 | 1/1987 | Kanamaru | 369/44.32 |
| 4,636,628 | 1/1987 | Tsukai | 369/44.32 |
| 4,637,004 | 1/1987 | Araki et al. | 369/44.32 |
| 4,694,442 | 9/1987 | Gijzen et al. | 369/44.32 |
| 4,829,508 | 5/1989 | Arita | 369/244 X |
| 4,947,481 | 8/1990 | Ikedo et al. | 369/249 X |

FOREIGN PATENT DOCUMENTS

| | | | |
|---|---|---|---|
| 0206929 | 9/1986 | Japan | 369/249 |
| 0150535 | 7/1987 | Japan | 369/44.32 |
| 0229541 | 10/1987 | Japan | 369/44.32 |

*Primary Examiner*—John W. Shepperd
*Attorney, Agent, or Firm*—Sughrue, Mion, Zinn, Macpeak & Seas

[57] ABSTRACT

A tilt control mechanism for maintaining an optical axis of an information detecting beam, emitted from an optical pickup (1) carried by a linearly movable carriage (3), perpendicular to an information recording surface of an information recording disk. The tilt control mechanism includes a carrying member (7) connected to the carriage (3) so as to either be movable or rotatable in the direction perpendicular to the information recording surface, the pickup (1) being carried by the carrying member (7) so as to be rotatable about a fulcrum on the optical axis. A detection device detects the fluctuation in separation distance beween the objective lens (4) of the pickup (1) and the information recording surface so that the carrying member (7) can be displayed or rotated relative to the carriage (3) in accordance with the output of the detection device.

7 Claims, 3 Drawing Sheets

TILT CONTROL MECHANISM

TECHNICAL FIELD

The present invention relates to a tilt control mechanism in an optical information recording disk playing apparatus.

PRIOR ART

In an optical information recording disk playing apparatus, an information recording disk (hereinafter simply referred to as a disk) may become warped over time causing the information recording surface of the disk to become slanted relative to the optical axis of an information detecting light beam radiated from an optical pickup. As a result, a track pitch between a target recording track and another recording track adjacent thereto is made equivalently narrow. Accordingly, if the size of the beam spot on the information recording surface is constant, the information on the target recording track is influenced by the pit information on the adjacent recording track, resulting in increase of cross talk.

In order to improve such deterioration in performance, a tilt servo apparatus has been used so that the tilt of the information recording surface relative to the optical axis of the information detecting light beam is detected by a tilt sensor. The tilt of the pickup is controlled on the basis of the detection output of the tilt sensor to maintain the optical axis of the information detecting light beam perpendicular to the information recording surface.

Three kinds of tilt control mechanisms for controlling the tilt of the optical axis of the information detecting optical beam in the tilt servo apparatus are known in the art. A first of these mechanisms is arranged such that, as shown in FIG. 1, a pickup 1 is supported by a carriage 3 linearly movably provided along a guide shaft 2. The pickup 1 is rotatable about a fulcrum P on the optical axis of the information detecting light beam emitted from the pickup 1: that is, on an optical axis O of an objective lens 4. Thus, the pickup 1 is rotated by a driving means (not shown) in accordance with a tilt angle of the optical axis O relative to the information recording surface of a disk 5. A second of these mechanisms is arranged such that, as shown in FIG. 2, a pickup 1 is supported by a carriage 3 so as to be rotatable about a fulcrum P provided at a position off-set from an optical axis O. Thus, the pickup 1 is rotated by a driving means (not shown), in accordance with a tilt angle of the optical axis O relative to the information recording surface of a disk 5. A third of these mechanisms is arranged such that, as shown in FIG. 3, a pickup 1 is fixed to a carriage 3, and a guide shaft 2 for guiding the carriage 3 is supported at its end so as to be rotatable about a fulcrum P. Thus, the guide shaft 2 is rotated by a driving means (not shown) in accordance with a tilt angle of an optical axis O relative to an information recording surface of a disk 5.

Of these conventional mechanisms, the first mechanism has a disadvantages in that the optical axis of the objective lens 4 and the rotary fulcrum P of the pickup 1 coincide with each other. Accordingly, the distance between the information recording surface of the disk 5 and the pickup 1 fluctuates as the pickup 1 rotates. The fluctuation of the separation distance cannot be compensated for by the stroke of a focus actuator of the objective lens 4, thereby increasing the burden of a DC component of the focus actuator. The second mechanism has a disadvantage in that the fulcrum P is offset from the optical axis O of the objective lens 4 so that the fluctuation in separation distance between the information recording surface of the disk 5 and the pickup 1 can only be partially compensated for. The third conventional mechanism has a disadvantage in that a large space is required for the structure because the long guide shaft 2 is arranged so as to rotate. However, the tilt operation is carried out substantially corresponding to the actual distribution of disk warpage so that the fluctuation in separation distance between the disk 5 and the pickup 1 is minimized.

SUMMARY OF THE INVENTION

The present invention has been attained to eliminate the foregoing disadvantages in the prior art. An object of the invention is to provide a tilt control mechanism which can compensate for substantial disk warpage without burdening a focus actuator and which does not require a large space for the structure.

The tilt control mechanism according to the present invention is arranged such that a pickup is carried by a carrying member which is connected to a linearly movable carriage so as to be movable or rotatable in the direction perpendicular to an information recording surface of a disk so that the pickup is rotatable about a fulcrum on an optical axis of the pickup, the carrying member being moved or rotated relative to the carriage by a first driving means in accordance with the separation distance between the information recording surface and the pickup, the pickup being rotated relative to the carrying member by a second driving means in accordance with a tilt angle of the optical axis relative to the information recording surface.

Further, in the tilt control mechanism, the fluctuation in separation distance between an objective lens of the pickup and the information recording surface is directly detected and can be corrected in accordance with the detection output.

BRIEF DESCRIPTION OF THE DRAWINGS

Other features and advantages of the present invention will be apparent from the following description taken in connection with the accompanying drawings wherein.

DETAILED DESCRIPTION OF THE INVENTION

Figure 1:
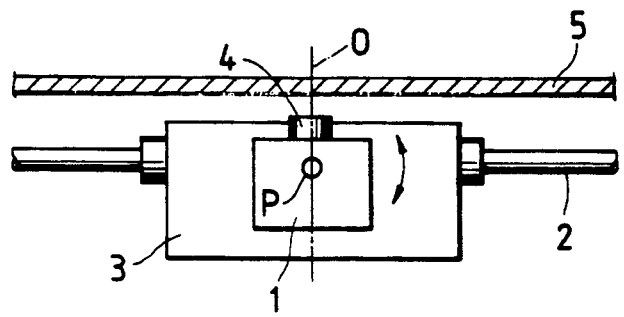
FIGS. 1 through 3 are schematic views showing respective examples of the prior art.
Figure 2:
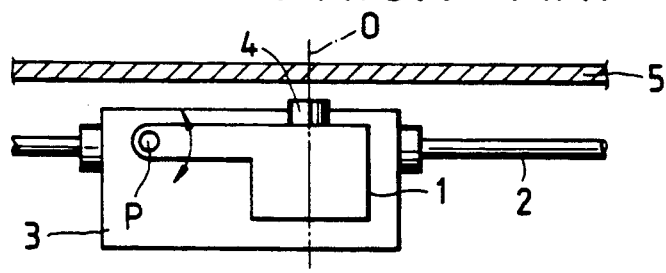
Figure 3:
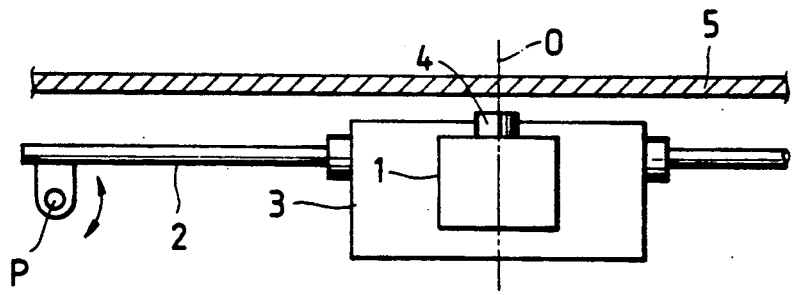

Referring to the drawings, embodiments of the present invention will be described in detail hereunder.

Figure 4:
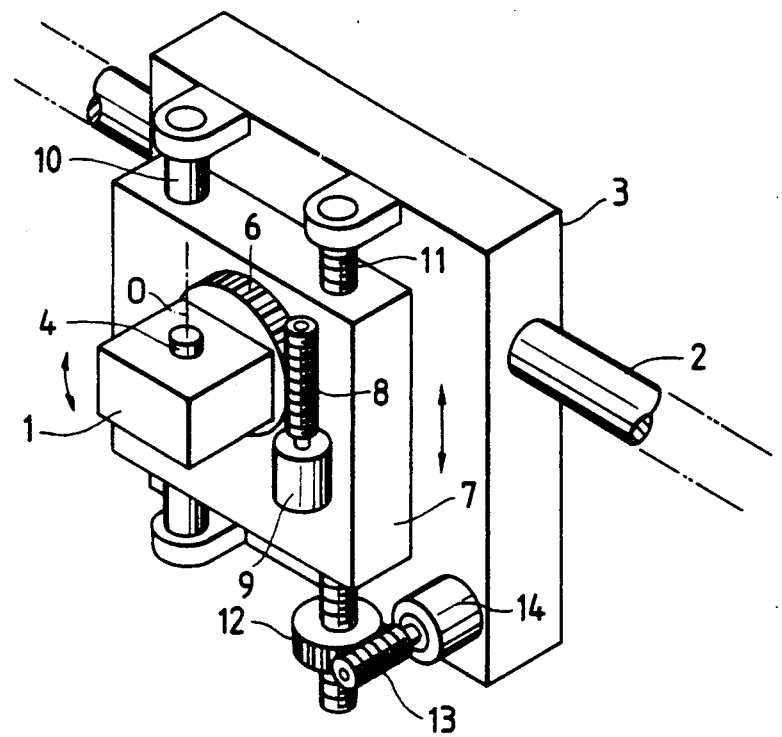
FIG. 4 is a schematic perspective view showing an embodiment of the present invention.

FIG. 4 is a schematic perspective view showing an embodiment of the present invention. In the drawing, an optical pickup 1 is connected to a carrying member 7 through a gear 6 fixed to one side surface of the optical pickup 1 so that the pickup 1 is rotatable about an optical axis of an information detecting beam emitted from the pickup 1; that is, about a fulcrum on an optical axis O of an objective lens 4. A worm 8 is engaged with the gear 6, and a motor 9 carried by the carrying member 7 is used as a driving source for the worm 8. The carrying member 7, rotatably carrying the pickup 1, is movably connected at one end thereof to a guide shaft 10 which is carried on a carriage 3 so as to extend in the direction of the optical axis O. The carrying member 7 is threadedly-engaged at another end thereof with a screw shaft 11 carried on the carriage 3 in parallel to the guide shaft 10. A gear 12 is fixed to one end of the screw shaft 11 and a worm 13 is engaged with the gear 12. A motor 14, disposed on the carriage 3, is used as a driving source for the worm 13. The carriage 3 is linearly movably connected to a guide shaft 2 which is fixed at opposite ends thereof.

In such an arrangement, the tilt of an information recording surface of a disk relative to the optical axis O of the objective lens 4 is detected by a tilt sensor (not shown). Although various tilt sensors have been known, the tilt sensor disclosed in Japanese Utility Model Unexamined Publication No. 59-160035 may be used, for example. A detection output of the tilt sensor is supplied to the motor 9 as a driving input thereto so that the pickup 1 is rotated about the fulcrum on the optical axis O of the objective lens 4, whereby the tilt of the pickup 1 is adjusted so as to make the optical axis O always perpendicular to the information recording surface of the disk. The tilt adjustment of the pickup 1 about the fulcrum on the optical axis causes a fluctuation in separation between the information recording surface of the disk and the pickup 1. If the position of the pickup 1 in the direction perpendicular to the information recording surface were fixed in the above case, the fluctuation in the separation would appear as a fluctuation in the DC component of a focus error signal so that the objective lens 4 would be displaced an amount corresponding to the fluctuation in the DC component, and the burden of a focus actuator would increase correspondingly.

According to the present invention, however, since the pickup 1, carried by the carrying member 7, is arranged to be movable in the direction perpendicular to the information recording surface it is possible to correct the fluctuation distance in separation between the information recording surface and the pickup 1 by controlling the position of the pickup 1 corresponding to the fluctuation distance through the motor 14 without placing any burden on the focus actuator. As the driving input to the motor 14, a detection output obtained as a result of detection of a fluctuation in DC component of the focus error signal or a detection output of a displacement sensor provided exclusively for directly detecting the displacement of the objective lens 4 may be used.

Figure 5:
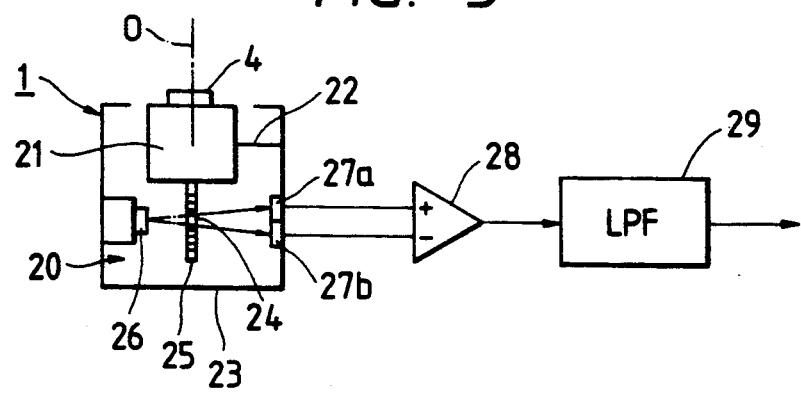
FIG. 5 is a view showing an example of a displacement sensor.
Figure 6A:
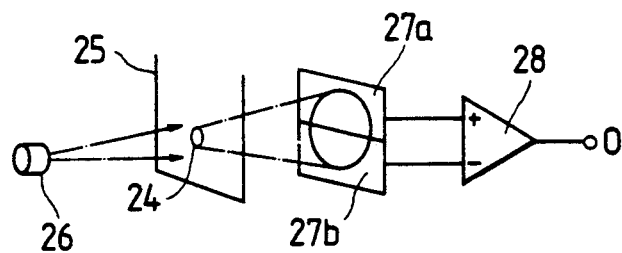
FIGS. 6A through 6C are views for explaining the operation of the displacement sensor of FIG. 5.
Figure 6B:
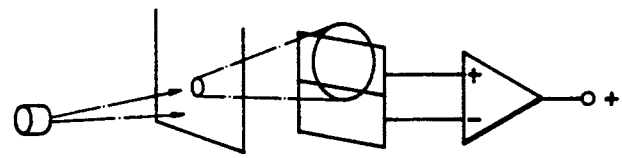
Figure 6C:
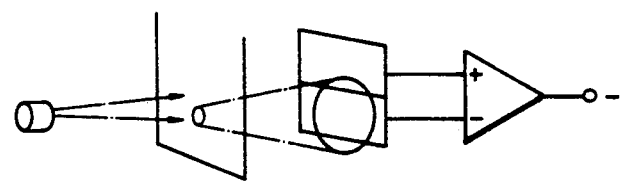

FIG. 5 shows an example of the arrangement of a displacement sensor 20. In the drawing, an optical system 21 including the objective lens 4 is supported by a focus actuator 22 arranged to be movable in the direction of the optical axis O relative to a pickup body 23. A shielding plate 25 having a pin hole 24 is attached to the optical system 21 at its lower end portion. A luminous element 26 is provided on one side of the shielding plate 25, and a pair of light-receiving elements 27a and 27b disposed in the direction of the optical axis O are provided on the other side of the shielding plate 25 so as to receive the light emitted from the luminous element 26 through the pin hole 24 of the shielding plate 25. The luminous element 26 and the light-receiving elements 27a and 27b have the positional relation therebetween as follows. When the optical system 21 is disposed at a neutral position as shown in FIG. 6A. the light-receiving elements 27a and 27b are equal to each other in intensity of the received light. Accordingly, if the optical system 21 is displaced from the neutral position to a position toward the disk as shown in FIG. 6B, the intensity of light received by the light-receiving element 27a increases, while if the optical system 21 is displaced from the neutral position in the direction away from the disk as shown in FIG. 6C. the intensity of light received by the light-receiving element 27b increases. Accordingly, if a difference between the respective outputs of the pair of light-receiving elements 27a and 27b is obtained through a differential amplifier 28 and a DC component of the thus obtained difference is detected by a low-pass filter 29, the polarity and level of the DC component may be used as information corresponding to the displacement of the optical system 21 including the objective lens 4.

The DC component is applied to the motor 14 as the driving input thereto so as to control the position of the pickup 1 in the direction of the optical axis O to thereby correct the fluctuation in separation distance between the information recording surface and the pickup 1 due to warpage of the disk so that the focus actuator 22 can be maintained at the neutral position. Accordingly, the burden on the focus actuator 22 due to the DC component of the focus error signal can be reduced so that a driving current can be correspondingly reduced.

Although the displacement sensor 20 is arranged to detect a difference in distribution of received light between the light-receiving elements 27a and 27b by using the pin hole 24 in the above embodiment, the present invention is not limited to the displacement sensor 20, but the arrangement may be such that the difference in distribution of received light is detected by using a so-called knife edge, a slit, or the like.

Figure 7:
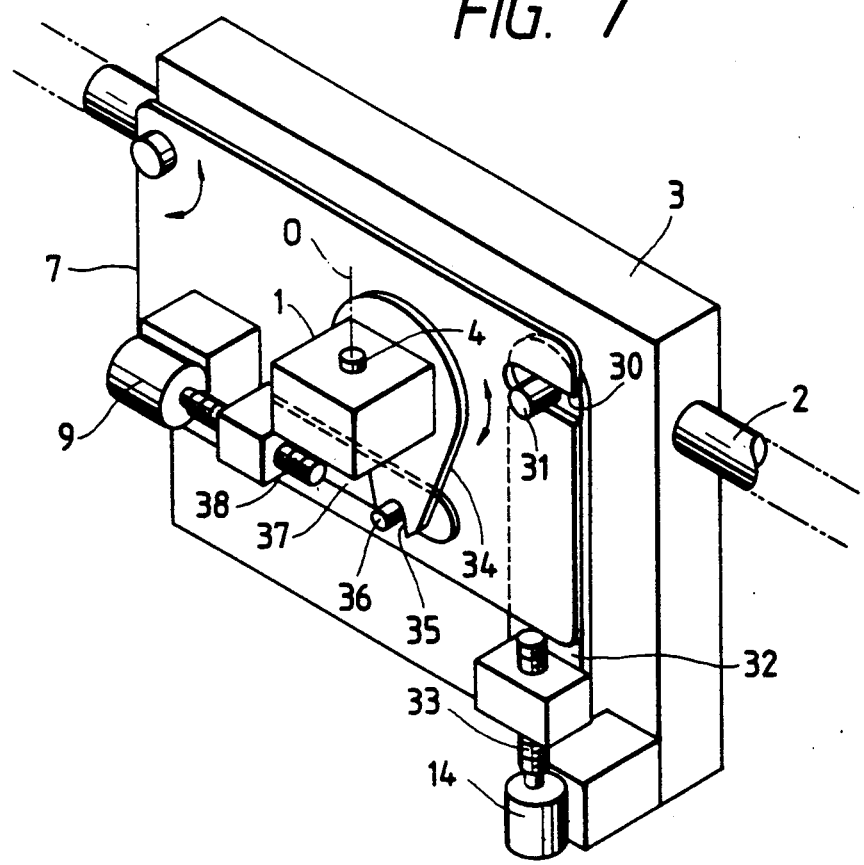
FIG. 7 is a schematic perspective view showing another embodiment of the present invention.

Although it has been described that the carrying member 7 is arranged to be movable in the direction perpendicular to the information recording surface of he disk in the above embodiment, the carrying member 7 may be arranged so as to the rotatable in the direction perpendicular to the information recording surface of the disk. Such an arrangement is shown in FIG. 7. In FIG. 7, a carrying member 7 carrying a pickup 1 thereon is rotatably connected at its corner to a carriage 3. A slide plate 32 has a pin 31 at one end thereof so that the slide plate 32 engages through the pin 31 with a slit 30 formed in the carrying member 7 at the side opposite to the above-mentioned corner portion. Thus, the carrying member 7 and the slide plate 32 constitute a link mechanism. A motor 14 is connected to the slide plate 32 at another end thereof through a screw shaft 33 so that the motor 14 acts as a diving source for the link mechanism. The pickup 1 is connected to the carrying member 7 so as to be rotatable about a fulcrum on an optical axis O of an objective lens 4 through a rotary plate 34 fixed on a side surface of the pickup 1. A slide plate 37 has a pin 36 at one end thereof so that the slide plate 37 engages through the pin 36 with a slit 35 formed in the rotary plate 34 at a projecting portion thereof. Thus, the rotary plate 34 and the slide plate 37 constitute another link mechanism. A motor 9 is connected to the slide plate 37 at another end thereof through a screw shaft 38 so that the motor 9 acts as a driving source for this link mechanism.

In such an arrangement, the pickup 1 is rotated about the fulcrum on the optical axis O of the objective lens 4 through the slide plate 37 and the rotary plate 34 by the motor 9 to which the detection output of a tilt sensor is supplied as a driving input thereto, so that the adjustment of the tilt of the pickup 1 is carried out. On the other hand, the carrying member 7 is rotated about the fulcrum by the motor 14 to which the detection output of the displacement sensor 20 shown in FIG. 5 is supplied as a driving input thereto. Thus, the position of the pickup 1 in the direction perpendicular to the information recording surface is adjusted to thereby correct the fluctuation in separation distance between the information recording surface and the pickup 1 due to warpage of the disk.

As described above, the tilt control mechanism according to the present invention is arranged so that a carrying member is connected to a linearly movable carriage so as to be movable or rotatable in the direction perpendicular to an information recording surface of a disk, a pickup is carried by the carrying member so as to be rotatable about a fulcrum on an optical axis of the pickup, and the adjustment of a tilt angle of the pickup and the correction of a fluctuation in separation distance between the pickup and the information recording surface are carried out by two driving systems, respectively, independently of each other. Accordingly, it is possible to compensate for significant disk warpage without burdening a focus actuator.

In the case of the arrangement in which the fluctuation in separation between the objective lens and the information recording surface is directly detected, the fluctuation in the separation can be accurately detected, and the detecting sensor can also be used for detecting erroneous operation so as to prevent the objective lens from colliding against a disk.

What is claimed is:

1. A tilt control mechanism for maintaining an optical axis of an information detecting beam, emitted from an optical pickup carried by a linearly movable carriage, perpendicular to an information recording surface of an information recording disk, said tilt control mechanism comprising:

a carrying member carrying said pickup and connected to said carriage so as to move said pickup in the direction perpendicular to said information recording surface, said pickup being carried by said carrying member so as to be rotatable about a fulcrum on said optical axis;

a first driving means for causing said carrying member to move or rotate relative to said carriage so as to maintain a substantially constant separation distance between said information recording surface and said pickup; and a second driving means for causing said pickup to rotate relative to said carrying member so as to maintain a substantially constant tilt angle between said optical axis and said information recording surface.

2. The tilt control mechanism according to claim 1, further comprising a detection means for directly detecting a fluctuation in the separation distance between an objective lens of said pickup and said information recording surface so that said first driving means causes said carrying member to move or rotate relative to said carriage in accordance with a detection output of said detection means.

3. The tilt control mechanism of claim 1, wherein said first driving means includes a guide shaft secured to said carriage for guiding said carrying member in a direction perpendicular to said information recording surface, a screw shaft rotatably disposed on said carriage and threadedly engaged with said carrying member, said screw shaft having a gear fixed to one end thereof, a worm engaged with said gear and means for rotating said worm so that the screw shaft causes said carrying member to move along said guide shaft.

4. The tilt control mechanism of claim 1 wherein said second driving means includes a gear fixed to said optical pickup and rotatable therewith, a worm engaged with said gear and means for rotating said worm so that said optical pickup is rotated.

5. The tilt control mechanism of claim 1, wherein one end of said carrying member is rotatably connected to a corresponding end of said carriage.

6. The tilt control mechanism of claim 5, wherein said first driving means includes a slide plate wherein one end of said slide plate is connected to another end of said carrying member, a screw shaft threadedly connected to said slide plate and means for rotating said screw shaft so as to move said slide plate in a linear direction such that said carrying member is rotated about said fulcrum.

7. The tilt control mechanism of claim 5, wherein said second driving means includes a rotary plate fixed to said pickup, a linear plate engaged at one end thereof to said rotary plate, a screw shaft threadedly engaged to another end of said linear plate and means for driving said screw shaft so as to linearly displace said linear plate and thereby rotate said pickup.

* * * * *